United States Patent
Szczeszynski et al.

(10) Patent No.: US 8,692,482 B2
(45) Date of Patent: Apr. 8, 2014

(54) CIRCUITRY TO CONTROL A SWITCHING REGULATOR

(75) Inventors: Gregory Szczeszynski, Hollis, NH (US); Matthew Szaniawski, Fremont, NH (US)

(73) Assignee: Allegro Microsystems, LLC, Worcester, MA (US)

( * ) Notice: Subject to any disclaimer, the term of this patent is extended or adjusted under 35 U.S.C. 154(b) by 437 days.

(21) Appl. No.: 12/966,139

(22) Filed: Dec. 13, 2010

(65) Prior Publication Data
US 2012/0146541 A1 Jun. 14, 2012

(51) Int. Cl.
G05F 1/00 (2006.01)
(52) U.S. Cl.
USPC ............ 315/307; 315/209 R; 315/308
(58) Field of Classification Search
USPC ............ 315/209 R, 210, 224, 225, 291, 294, 315/297, 299, 300, 301, 302, 306, 307, 308, 315/311, 312, 313, 361, 362
See application file for complete search history.

(56) References Cited

U.S. PATENT DOCUMENTS

| | | | |
|---|---|---|---|
| 4,739,226 A | 4/1988 | Murata | |
| 6,222,385 B1 | 4/2001 | Kang | |
| 6,621,235 B2 | 9/2003 | Chang | |
| 6,636,104 B2 | 10/2003 | Henry | |
| 6,690,146 B2 | 2/2004 | Burgyan et al. | |
| 6,822,403 B2 | 11/2004 | Horiuchi et al. | |
| 6,930,679 B2 | 8/2005 | Wu et al. | |
| 6,963,175 B2 | 11/2005 | Archenhold et al. | |
| 7,116,086 B2 | 10/2006 | Burgyan et al. | |
| 7,129,679 B2 | 10/2006 | Inaba et al. | |
| 7,148,632 B2 | 12/2006 | Berman et al. | |
| 7,235,954 B2 | 6/2007 | Murakami | |
| 7,291,989 B2 | 11/2007 | Namba et al. | |
| 7,307,614 B2 | 12/2007 | Vinn et al. | |
| 7,317,403 B2 | 1/2008 | Grootes et al. | |
| 7,375,472 B2 | 5/2008 | Wong et al. | |

(Continued)

FOREIGN PATENT DOCUMENTS

| | | |
|---|---|---|
| EP | 1 079 667 A2 | 2/2001 |
| EP | 1 079 667 A3 | 2/2001 |

(Continued)

OTHER PUBLICATIONS

Amendment under 37 CFR §1.312 dated Mar. 7, 2012; for U.S. Appl. No. 12/267,645, filed Nov. 10, 2008, 4 pages.

(Continued)

*Primary Examiner* — Douglas W Owens
*Assistant Examiner* — Jianzi Chen
(74) *Attorney, Agent, or Firm* — Daly, Crowley, Mofford & Durkee, LLP

(57) ABSTRACT

In one aspect, a circuit includes a switching regulator configured to provide power to a load, a current regulator circuit coupled to the load and a response circuit configured to provide a control signal to the switching regulator in response to electrical changes of the current regulator circuit. The control signal changes non-linearly with respect to the electrical changes at the current regulator circuit.

In another aspect, a circuit includes an adaptive regulation voltage circuit configured to provide a regulation voltage to a first input of an amplifier to maintain operability of a current regulator circuit. The adaptive regulation voltage circuit replicates electrical characteristics of the current regulator circuit.

23 Claims, 8 Drawing Sheets

(56) References Cited

U.S. PATENT DOCUMENTS

| | | | |
|---|---|---|---|
| 7,466,082 | B1 | 12/2008 | Snyder et al. |
| 7,479,743 | B2 | 1/2009 | Namba et al. |
| 7,482,765 | B2 | 1/2009 | Ito et al. |
| 7,528,551 | B2 | 5/2009 | Ball |
| 7,675,245 | B2 | 3/2010 | Szczeszynski et al. |
| 7,675,246 | B2 | 3/2010 | Chiang et al. |
| 7,928,670 | B2 | 4/2011 | Chen et al. |
| 7,999,487 | B2 | 8/2011 | Szczeszynski |
| 2004/0051478 | A1 | 3/2004 | Otake et al. |
| 2004/0251854 | A1 | 12/2004 | Matsuda et al. |
| 2005/0007085 | A1 | 1/2005 | Murakami |
| 2005/0088207 | A1 | 4/2005 | Rader et al. |
| 2005/0104542 | A1 | 5/2005 | Ito et al. |
| 2005/0156540 | A1 | 7/2005 | Ball |
| 2005/0243022 | A1 | 11/2005 | Negru |
| 2005/0243041 | A1 | 11/2005 | Vinn |
| 2006/0028147 | A1 | 2/2006 | Shinmen et al. |
| 2006/0125320 | A1 | 6/2006 | Namba et al. |
| 2006/0139299 | A1 | 6/2006 | Tsuchiya |
| 2006/0170287 | A1 | 8/2006 | Ito et al. |
| 2007/0120506 | A1 | 5/2007 | Grant |
| 2007/0267978 | A1 | 11/2007 | Shteynberg et al. |
| 2008/0048573 | A1 | 2/2008 | Ferentz et al. |
| 2008/0110469 | A1 | 5/2008 | Weinberg |
| 2008/0144236 | A1 | 6/2008 | Chiang et al. |
| 2008/0164828 | A1 | 7/2008 | Szczeszynski et al. |
| 2008/0243041 | A1 | 10/2008 | Brenner et al. |
| 2009/0021384 | A1 | 1/2009 | Jacubovski et al. |
| 2009/0128045 | A1 | 5/2009 | Szczeszynski et al. |
| 2009/0195183 | A1 | 8/2009 | Yang |
| 2009/0289559 | A1 | 11/2009 | Tanaka et al. |
| 2009/0302776 | A1 | 12/2009 | Szczeszynski et al. |
| 2010/0060177 | A1 | 3/2010 | Takata et al. |
| 2010/0072922 | A1 | 3/2010 | Szczeszynski et al. |
| 2011/0062929 | A1* | 3/2011 | Strydom et al. ............ 323/284 |
| 2011/0234122 | A1 | 9/2011 | Yu et al. |
| 2012/0133299 | A1 | 5/2012 | Capodivacca et al. |
| 2013/0162152 | A1 | 6/2013 | Lee et al. |

FOREIGN PATENT DOCUMENTS

| | | |
|---|---|---|
| EP | 1 499 165 A2 | 1/2005 |
| JP | 3-196280 | 8/1991 |
| JP | H06-044807 | 2/1994 |
| JP | H11-507750 A | 7/1999 |
| JP | 2002-257871 A | 9/2002 |
| JP | 2002-281345 A | 9/2002 |
| JP | 2003-063062 | 3/2003 |
| JP | 2003-215534 | 7/2003 |
| JP | 2004-134147 A | 4/2004 |
| JP | 2005-116738 A | 4/2005 |
| JP | 2006-005381 | 1/2006 |
| JP | 3755770 B2 | 3/2006 |
| JP | 2006-158186 A | 6/2006 |
| JP | 2006-185942 | 7/2006 |
| JP | 2006-521659 A | 9/2006 |
| JP | 2006-318326 A | 11/2006 |
| JP | 2005-122979 | 5/2007 |
| JP | 2008-311602 A | 12/2008 |
| WO | WO 00/13310 | 3/2000 |
| WO | WO 02/03087 A1 | 1/2002 |
| WO | WO 2007/043389 A1 | 4/2007 |
| WO | WO 2007/096868 A1 | 8/2007 |
| WO | WO 2007/126630 A2 | 11/2007 |
| WO | WO 2007/126630 A3 | 11/2007 |
| WO | WO 2008/086050 A2 | 7/2008 |
| WO | WO 2008/086050 A3 | 7/2008 |
| WO | WO 2009/064682 A2 | 5/2009 |
| WO | WO 2009/064682 A3 | 5/2009 |

OTHER PUBLICATIONS

U.S. Office Action dated Dec. 21, 2010 for U.S. Appl. No. 12/136,347, filed Jun. 10, 2008.

Response to U.S. Office Action dated Dec. 21, 2010 for U.S. Appl. No. 12/136,347, filed Jun. 10, 2008.

U.S. Office Action dated Sep. 1, 2011; for U.S. Appl. No. 12/267,645; 24 pages.

PCT Partial Search Report and Invitation to Pay Additional Fees dated Jun. 16, 2008 for PCT/US2008/050026.

PCT International Preliminary Report on Patentability of the ISA dated May 27, 2010 for PCT/US2008/082934, pp. 1-14.

PCT Search Report and Written Opinion for the ISA of PCT/US2008/082934 mailed Dec. 15, 2009.

PCT Invitation to Pay Additional Fees for PCT/US2008/050026, dated Jun. 16, 2008; 5 pages.

PCT Search Report and Written Opinion of the ISA for PCT/US2008/050026 dated Aug. 29, 2008.

Bakker et al.; "A CMOS Nested-Chopper Instrumentation Amplifier with 100-nV Offset;" IEEE Journal of Solid-State Circuits; vol. 35, No. 12; Dec. 2000; pp. 1877-1883.

Burkhart et al.; "A Monolithically Integrated 128 LED-Driver and its Application;" IEEE Transactions on Consumer Electronics; vol. CE-32, No. 1; Feb. 1986; pp. 26-31.

Allegro Microsystems, Inc.; A8500 Data Sheet; "Flexible WLED/RGB Backlight Driver for Medium Size LCD's," Dec. 8, 2006; pp. 1-15.

Allegro Microsystems, Inc. A8432 and A8433 Data Sheets; WLED Backlight Drivers with True Shutdown and OVP; Jan. 25, 2005; pp. 1-6.

Linear Technology; Design Note 154; Short-Circuit Protection for Boost Regulators; 1997; pp. 1-2.

Maxim; Dallas Semiconductor; "Charge-Pump and Step-Up DC-DC Converter Solutions for Powering White LEDs in Series or Parallel Connections:" Apr. 23, 2002; 15 pages.

Maxim Data Sheet; MAX1570; "White LED Current Regulator with 1x/1.5x High-Efficiency Charge Pump;" #19-2526; Jul. 2002; pp. 1-12.

Maxim Data Sheet; MAX1574; "180mA, 1x/2x, White LED Charge Pump in 3mm×3mm TDFN;" #19-3117; Dec. 2003; pp. 1-9.

Maxim Data Sheet; MAX1576; "480mA White LED 1x/1.5x./2x Charge Pump for Backlighting and Camera Flash;" #19/3326; Aug. 2005; pp. 1-14.

Maxim, Data Sheet MAX16807/MAX16808, Integrated 8-Channel LED Drivers with Switch-Mode Boost and SEPIC Controller, Oct. 2006, pp. 1-21.

Nippon Precision Circuits, Inc.; SM8132A; "White LED Driver IC;" Nippon Precision Circuits, Inc.; May 2005; pp. 1-18.

Rohm, Data Sheet BD6066GU, Silicon Monolithic Integrated Circuit, Apr. 2005, pp. 1-6.

Patent No. 7,675,245, issued Mar. 9, 2010.

U.S. Appl. No. 12/629,374, filed Dec. 2, 2009.

U.S. Appl. No. 12/136,347, filed Jun. 10, 2008.

U.S. Appl. No. 12/267,645, filed Nov. 10, 2008.

PCT Search Report of the ISA for PCT/US2011/062500 dated Apr. 3, 2012.

Written Opinion of the ISA for PCT/US2011/062500 dated Apr. 3, 2012.

Office Action dated Nov. 8, 2011; for U.S. Appl. No. 12/629,374; 18 pages.

Response to Office Action dated Sep. 1, 2011; for U.S. Appl. No. 12/267,645; 7 pages.

Notice of Allowance dated Jan. 11, 2012; for U.S. Appl. No. 12/267,645; 10 pages.

Notice of Allowance dated May 25, 2012; for U.S. Appl. No. 12/629,374, filed Dec. 2, 2009; 11 pages.

Letter from Yuasa and Hara; dated Jul. 8, 2013; for JP Pat. App. No. 2010-534111; 2 pages.

JP Response to Office Action (with English translation of claims); filed May 20, 2013; for JP Pat. App. No. 2010-534111; 8 pages.

Response to Taiwanese Office Action (with Claims in English); filed Jul. 11, 2013; for TW Pat. App. No. 097144152; 5 pages.

Notification Concerning Transmittal of IPRP dated Jun. 27, 2013, including International Preliminary Report on Patentability, and Written Opinion of the ISA; for International Appl. No. PCT/US2011/062500, 10 pages.

Taiwan Office Action and Search Report (in Taiwanese); for TW Pat. App. No. 097144152; 7 pages.

(56) References Cited

OTHER PUBLICATIONS

Taiwan Office Action and Search Report (in English); for TW Pat. App. No. 097144152; 8 pages.
U.S. Appl. No. 8,274,238; Part 1 of 3; 303 pages, Szczeszynski et al., Sep. 25, 2012.
U.S. Appl. No. 8,274,238; Part 2 of 3; 303 pages, Szczeszynski et al., Sep. 25, 2012.
U.S. Appl. No. 8,274,238; Part 3 of 3; 303 pages, Szczeszynski et al., Sep. 25, 2012.
U.S. Appl. No. 7,999,487; 95 pages, Szczeszynski, Aug. 16, 2011.
Japanese Notice of Rejection; dated Feb. 21, 2013; for JP Pat. App. No. 2010-534111; 4 pages.
Notice of Allowance; dated Oct. 9, 2013; for U.S. Appl. No. 13/428,654; 24 pages.
Letter to Yuasa and Hara; dated Oct. 4, 2013; for Japanese Pat. App. No. 2010-234111; 3 pages.
Letter from Yuasa and Hara; dated Oct. 21, 2013; Japanese Pat. App. No. 2010-234111; 1 page.
Japanese Response filed Oct. 11, 2013; Japanese Pat. App. No. 2010-234111; 4 pages.
Japanese Notice of Reasons for Rejection (English Translation); dated Aug. 1, 2013; for Japanese Pat. App. No. 2010-234111; 2 pages.
Taiwan Allowance Decision of Examination; dated Aug. 30, 2013; for Taiwanese Pat. App. No. 097144152; 2 pages.
Email from Taiwan International Patent & Law Office; dated Sep. 5, 2013; for Taiwanese Pat. App. No. 097144152; 2 pages.
Notification Concerning Transmittal of International Preliminary Report on Patentability (including IPRP and the Written Opinion of the ISA) dated Jun. 27, 2013 for International Appl. No. PCT/US2011/062500, filed on Nov. 30, 2011, 10 pages.

* cited by examiner

CIRCUITRY TO CONTROL A SWITCHING REGULATOR

BACKGROUND

A variety of electronic circuits are used to drive diode loads and, more particularly, to control electrical current through strings of series-connected light-emitting diodes (LEDs), which, in some examples, form an LED display, or, more particularly, a backlight for a display, for example, a liquid crystal display (LCD). It is known that individual LEDs have a variation in forward voltage drop from unit to unit. Therefore, the strings of series-connected LEDs can have a variation in forward voltage drop.

Strings of series-connected LEDs can be coupled to a common switching regulator, e.g., a boost switching regulator, at one end of the LED strings, the switching regulator configured to provide a high enough voltage to supply each of the strings of LEDs. The other end of each of the strings of series-connected LEDs can be coupled to a respective current sink, configured to sink a relatively constant current through each of the strings of series-connected LEDs.

It will be appreciated that the voltage generated by the common switching regulator must be a high enough voltage to supply the one series-connected string of LEDs having the greatest total voltage drop, plus an overhead voltage needed for proper operation of the respective current sink. In other words, if four series-connected strings of LEDs have voltage drops of 30 Volts, 30 Volts, 30 Volts, and 31 Volts, and each respective current sink requires at least one volt in order to operate, then the common boost switching regulator must supply at least 32 Volts.

SUMMARY

In one aspect, a circuit includes a switching regulator configured to provide power to a load, a current regulator circuit coupled to the load and a response circuit configured to provide a control signal to the switching regulator in response to electrical changes of the current regulator circuit. The control signal changes non-linearly with respect to the electrical changes at the current regulator circuit.

In another aspect, a circuit includes a switching regulator configured to provide power to a load, a current regulator circuit coupled to the load and an adaptive response circuit. The adaptive response circuit includes an amplifier configured to provide a control signal to the switching regulator in response to electrical changes at the current regulator. The adaptive response circuit includes a first input and a second input coupled to the current regulator circuit and an adaptive regulation voltage circuit configured to provide a regulation voltage to the first input of the amplifier to maintain operability of the current regulator circuit. The adaptive regulation voltage circuit replicates electrical characteristics of the current regulator circuit.

DESCRIPTION OF THE DRAWINGS

The foregoing features of the invention, as well as the invention itself may be more fully understood from the following detailed description of the drawings, in which.

DETAILED DESCRIPTION

Before describing the present invention, some introductory concepts and terminology are explained. The term "boost switching regulator" is used to describe a known type of switching regulator that provides an output voltage higher than an input voltage to the boost switching regulator. While a certain particular circuit topology of boost switching regulator is shown herein, it should be understood that boost switching regulators have a variety of circuit configurations. As used herein, the term "buck switching regulator" is used to describe a known type of switching regulator that provides an output voltage lower than an input voltage to the buck switching regulator. It should be understood that there are still other forms of switching regulators other than a boost switching regulator and other than a buck switching regulator, and this invention is not limited to any one type.

DC-DC converters are described herein and the described DC-DC converters can be any form of switching regulator, including, but not limited to, the above-described boost and buck switching regulators.

As used herein, the term "current regulator" is used to describe a circuit or a circuit component that can regulate a current passing through the circuit or circuit component to a predetermined, i.e., regulated, current. A current regulator can be a "current sink," which can input a regulated current, or a "current source," which can output a regulated current. A current regulator has a "current node" at which a current is output in the case of a current source, or at which a current is input in the case of a current sink.

Described herein are various embodiments including circuitry and techniques to control a switching regulator that supplies a regulated output voltage to a load, which load in turn is controlled by a current regulator circuit. In one set of embodiments, the circuitry is configured to provide a non-linear increase in a control signal provided to the switching regulator in response to a decrease in a voltage at a load. In this way, the switching regulator can respond faster than otherwise possible to a step response that results in a drop in regulated output voltage provided to the load. In one example, the circuitry includes a non-linear amplifier that is configured to provide a higher-than-linear increase in the control signal level in response to a decrease in the current regulator voltage.

In another embodiment, an adaptive regulation voltage circuit is configured to provide sufficient voltage to one or more current regulators regardless of temperature, processing constraints and other electrical constraints to ensure current regulator circuits maintain operability. Other embodiments will be apparent to one of ordinary skill in the art in view of the specification.

Figure 1A:
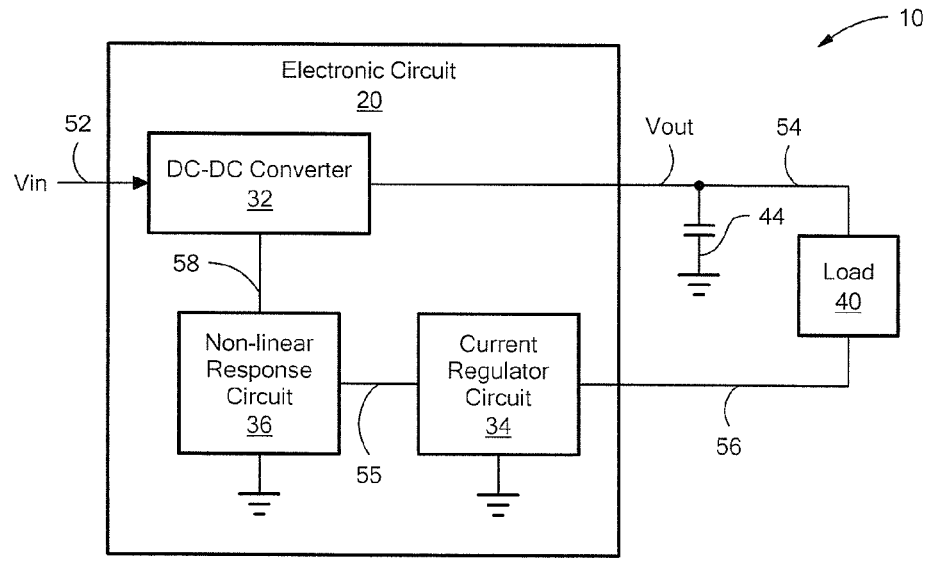
FIG. 1A is block diagram of a circuit to drive a load.

Referring to FIG. 1A, a circuit 10 includes an electronic circuit 20 (e.g., an integrated circuit (IC)) to drive a load 40. The circuit 10 also includes a capacitor 44 with one end of the capacitor coupled to the load 40 and the other end of the capacitor coupled to ground. In one example, the capacitor 44 functions as a filter. The electronic circuit 20 includes a DC-DC converter 32 that is configured to receive an input voltage, Vin, from a power source (not shown) via a connection 52 and to provide a regulated output voltage, Vout, to the load 40 through a connection 54 in response to a control signal 58.

The electronic circuit 20 also includes a current regulator circuit 34 coupled to the load 40 by a connection 56. The electronic circuit 20 also includes a non-linear response circuit 36 that is coupled to the current regulator circuit 34 by a connection 55 and is coupled to the DC-DC converter 32 by a connection 58.

The various connections described herein may be referred to herein interchangeably with the signal carried by the respective connection. For example, reference character 52 may be used interchangeably to refer to the connection to the DC-DC converter 32 and to the input voltage, Vin, associated with such a connection.

In one example, the non-linear response circuit 36 provides a control signal 58 to the DC-DC converter 32 responsive to electrical changes at the current regulator circuit 34. The control signal 58 controls the regulated voltage Vout provided at the output of the DC-DC converter 32. In particular, the control signal 58 changes non-linearly with respect to the electrical changes at the current regulator circuit 34. In one particular example, as a voltage at the current regulator circuit 34 drops, the control signal 58 increases non-linearly (e.g., FIGS. 2A, 2C, 2D). In one example, the non-linear increase is an exponential increase.

In some embodiments, the current regulator circuit 34, which is shown to be coupled to the bottom of the load 40 can instead be at the top of the load. In these embodiments, a regulator input node receives the regulated voltage, Vreg, and a regulator output node is coupled to the load.

Figure 1B:
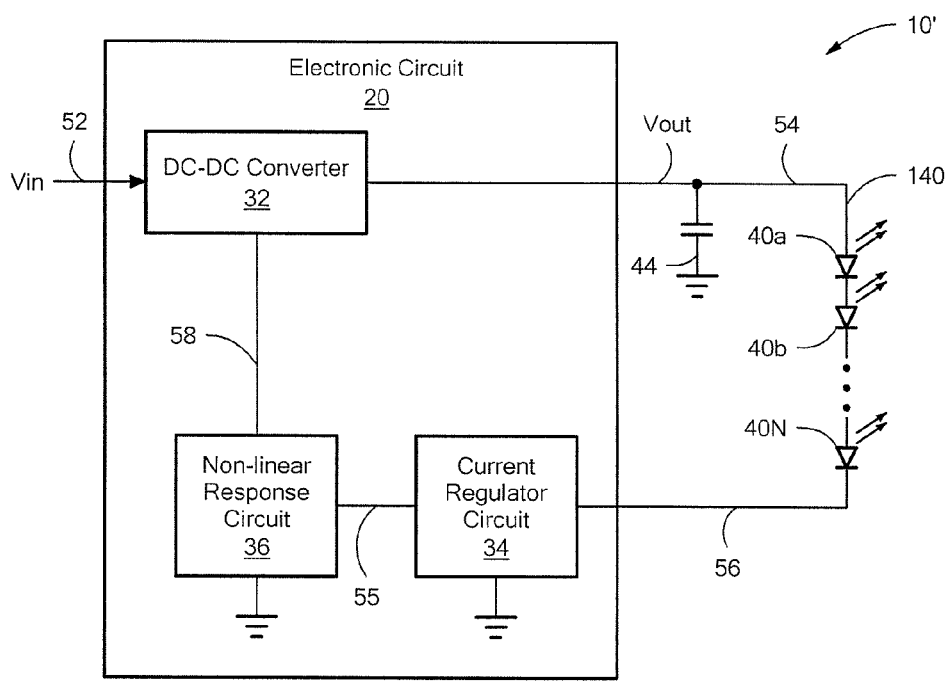
FIG. 1B is a block diagram of an example of the circuit in FIG. 1A that includes a string of light emitting diodes (LEDs) as the load.
Figure 1C:
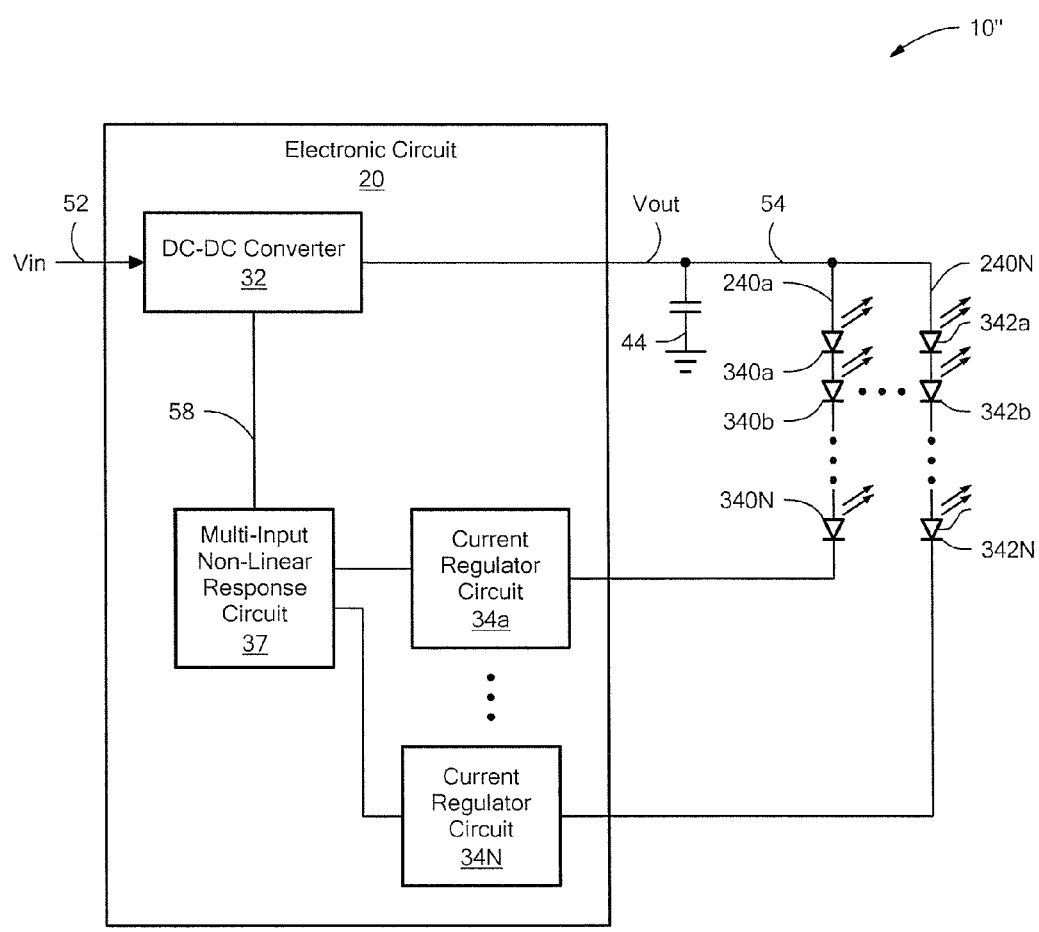
FIG. 1C is a block diagram of another example of the circuit of FIG. 1A that includes multiple strings of LEDs as the load.

Referring to FIGS. 1B and 1C, in some examples, the load 40 may be one or more strings of one or more series-connected light emitting diodes (LEDs). For example, in FIG. 1B, a circuit 10' includes a string 140 of series-connected LEDs (e.g., an LED 40*a*, an LED 40*b*, . . . , an LED 40N) as the load 40. In another example, in FIG. 1C, a circuit 10" includes a plurality of strings (e.g., a string 240*a*, . . . , a string 240N) each having a set of series-connected LEDs (e.g., the string 240*a* includes an LED 340*a*, an LED 340*b*, . . . , an LED 340N and the string 240N includes an LED 342*a*, an LED 342*b*, . . . , and an LED 342N). In one example, each of the strings 240*a*-240N is coupled to a respective current regulator circuit 34*a*-34N and each of the current regulator circuits 34*a*-34N is connected to a multi-input non-linear response circuit 37 that includes, for example, a multi-input amplifier (not shown). An illustrative multi-input amplifier is found in U.S. Patent Application Publication Number 2009/0128045, published May 21, 2009, entitled "ELECTRONIC CIRCUITS FOR DRIVING SERIES CONNECTED LIGHT EMITTING DIODE STRINGS," which is incorporated herein by reference in its entirety.

In one example, one or more of the current regulators 34*a*-34N may be one or more of the current regulators described herein (e.g., a current regulator circuit 34' (FIG. 2A) and a current regulator circuit 34" (FIG. 3A)). While FIGS. 1B and 1C include LEDs as examples of the load 40, other electrical components may be used as the load 40.

Figure 2A:
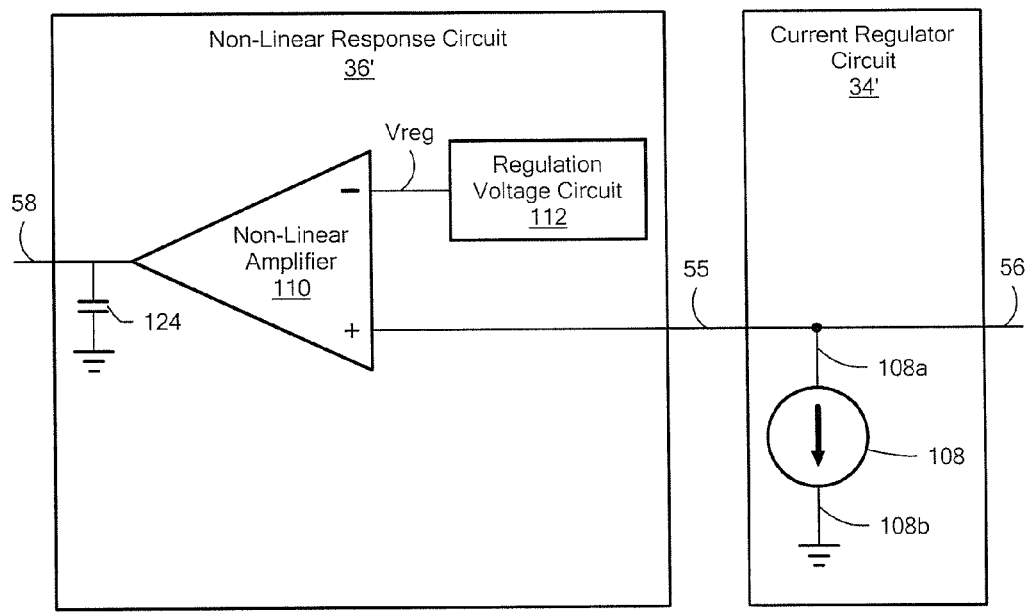
FIG. 2A is a block diagram of an example of a non-linear response circuit and an example of a current regulator circuit.

Referring to FIG. 2A, in one example, the current regulator circuit 34 (FIGS. 1A, 1B) may be configured as a current regulator circuit 34' and the non-linear response circuit 36 (FIGS. 1A, 1B) may be configured as a non-linear response circuit 36'. The current regulator circuit 34', here in the form of a current sink, includes a current sink 108 having one end 108*b* coupled to ground and the other end 108*a* coupled to the load 40 (FIG. 1) by the connection 56 and to the non-linear response circuit 36 by the connection 55. The non-linear response circuit 36' includes a non-linear amplifier 110 (e.g., a non-linear transconductance amplifier) that has one input coupled to the current regulator circuit 34' by the connection 55 and a second input coupled to a regulation voltage circuit 112 that provides a regulation voltage, Vreg, to the amplifier 110 that is selected to guarantee sink current operation. In one illustrative example, the regulation voltage, Vreg, is on the order of 650 mV.

The output of the non-linear amplifier 110 is coupled to a capacitor 124 (sometimes referred to as a compensation capacitor). The capacitor 124 can be comprised of an output capacitance of the amplifier 110 in parallel with an input capacitance of a node 32*b* (see FIG. 2A) of the DC-DC converter 32. However, in other arrangements, the capacitor 124 can include other capacitors as well. The capacitor 124 can have a value selected to stabilize a feedback control loop. In one example, the capacitor 124 has capacitance on the order of 10 nanofarads (nF). In other examples, a resistor (not shown) may be added in series with the capacitor 124 to enable a faster feedback response.

The non-linear amplifier 110 has a variable non-linear gain such that its output current varies in a non-linear fashion in response to a difference, or error voltage, between its inputs. In some arrangements, the amplifier 110 is a transconductance amplifier that provides a voltage current output. In these arrangements, the output stage of the amplifier charges or discharges the capacitor 124 according to the input signal levels and the transfer function of the amplifier 110 in order to thereby adjust the control signal 58 accordingly.

Figure 2B:
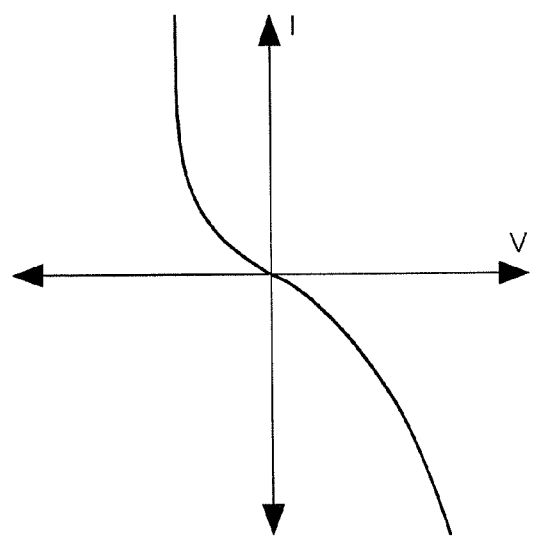
FIG. 2B is a graph of current versus change of current for an exponential inverting transconductance amplifier.

In one example, the non-linear amplifier 110 implements an exponential function, such that an output current of the amplifier increases and decreases exponentially with decreases and increases in the difference voltage between its inputs, respectively. An illustrative example of a non-linear transfer function is shown in FIG. 2B.

In operation, as the voltage at the current regulator node 108*a* decreases below the regulation voltage Vreg, the amplifier output increases in greater than a linear fashion so as to essentially "over amplify" such input voltage differences and cause the DC-DC converter to respond faster than otherwise possible. In this way, the non-linear transfer function of the amplifier 110 provides a quicker response to large step responses (e.g., an increase in the supply voltage, Vin, provided to the DC-DC converter 32 or a significant load increase) than a linear amplifier. In particular, if a step-response, for example in the form of an increased load, causes a drop in the regulated output voltage, Vout, then the voltage at the connection 55 will drop. Typically, a current regulator 34 can regulate down to a voltage of approximately 650 mV, below which the load 40 may not be supplied with sufficient current, resulting in the LEDs dimming or turning off entirely. If the step response is so large as to cause the voltage at the current regulator to drop below 650 mV, such as to a level of approximately 350 mV, the amplifier 110 would sense only 300 mV between its inputs, an error which would not be enough to reach the amplifier output current limit. By using a non-linear amplifier 110 that can quickly reach its current limit, and therefore, provides a non-linearly varying control signal to the DC-DC converter 32, the DC-DC converter can provide a regulated output voltage Vout that can increase fast enough to account for sudden voltage drops.

Figure 2C:
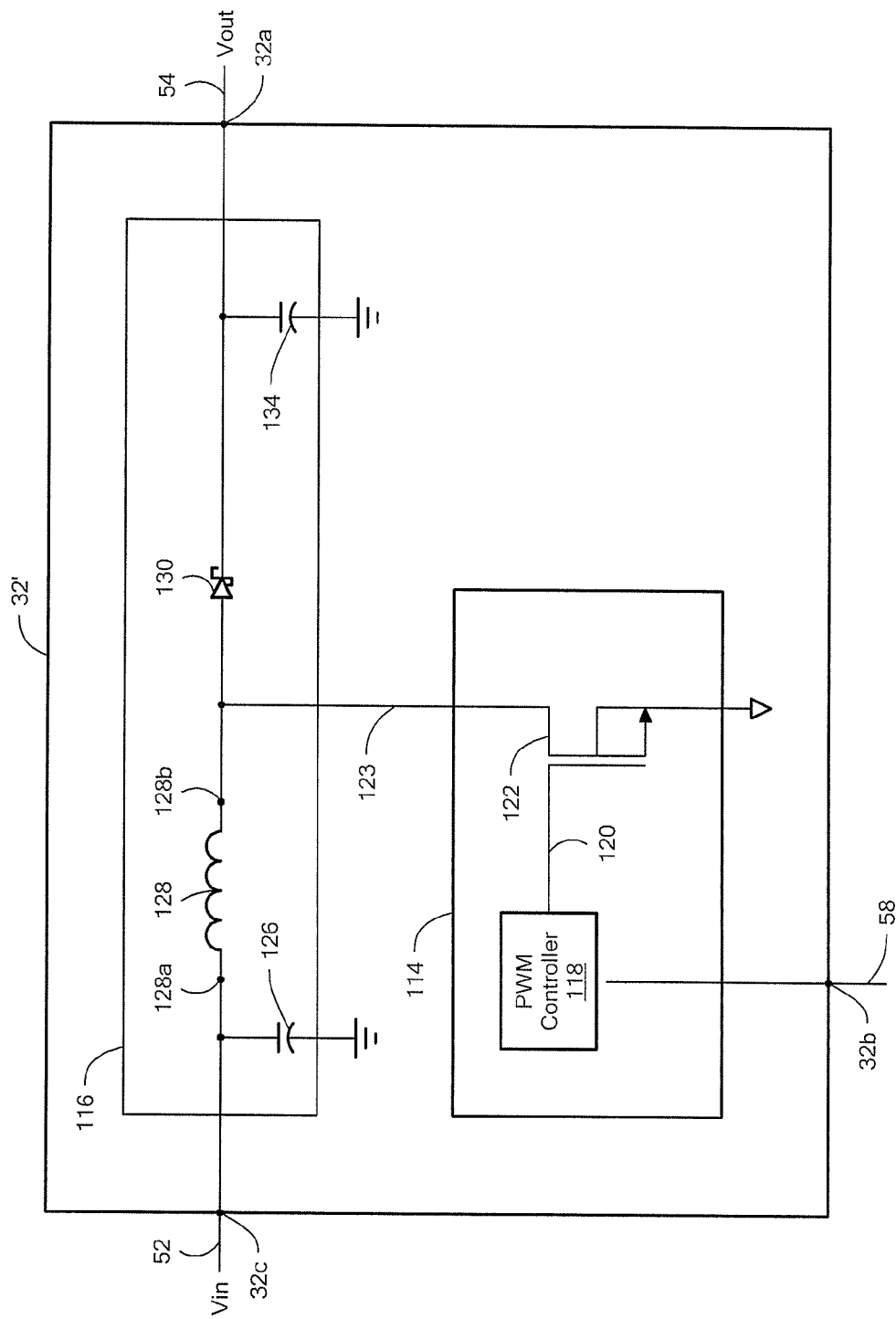
FIG. 2C is a circuit diagram of an example of a DC-DC converter.

Referring to FIG. 2C, one example of the DC-DC converter 32 (FIG. 1A) is a DC-DC converter 32'. The DC-DC converter 32' includes a first portion 114 that can be within the above-described electronic circuit 20, and a second portion 116 that can be external to but coupled to the electric circuit 20.

The first portion 114 includes a pulse width modulation (PWM) controller 118 configured to receive the control signal 58 from the non-linear response circuit 36 of FIG. 1A. The PWM controller 118 is configured to generate a PWM signal 120. A control current passing element, for example, a field-effect transistor (FET) 122, is coupled to receive the PWM signal 120 at a gate node and to receive a pulsed current signal 123 at a drain node.

The second portion 116 includes an input capacitor 126 coupled between the input voltage, Vin, received at the node 32c and a ground. An inductor 128 includes an input node 128a also coupled to receive the input voltage, Vin, and an output node 128b coupled to the drain node of the FET 122. A diode 130 includes an anode coupled to the output node 128b of the inductor 128 and a cathode coupled to the converter output node 32a, at which the regulated output voltage, Vout, is generated. An output capacitor 134 is coupled between the output node 32a and ground. The illustrated converter 32' operates in the manner of a conventional PWM boost switching regulator, to increase the duty cycle of the switch 122 and thus the regulated output voltage, Vout, in response to an increasing control signal 58. It will be appreciated by those of ordinary skill in the art that the PWM oscillator 118 and control signal 58 may implement current or voltage node duty cycle control.

Figure 3A:
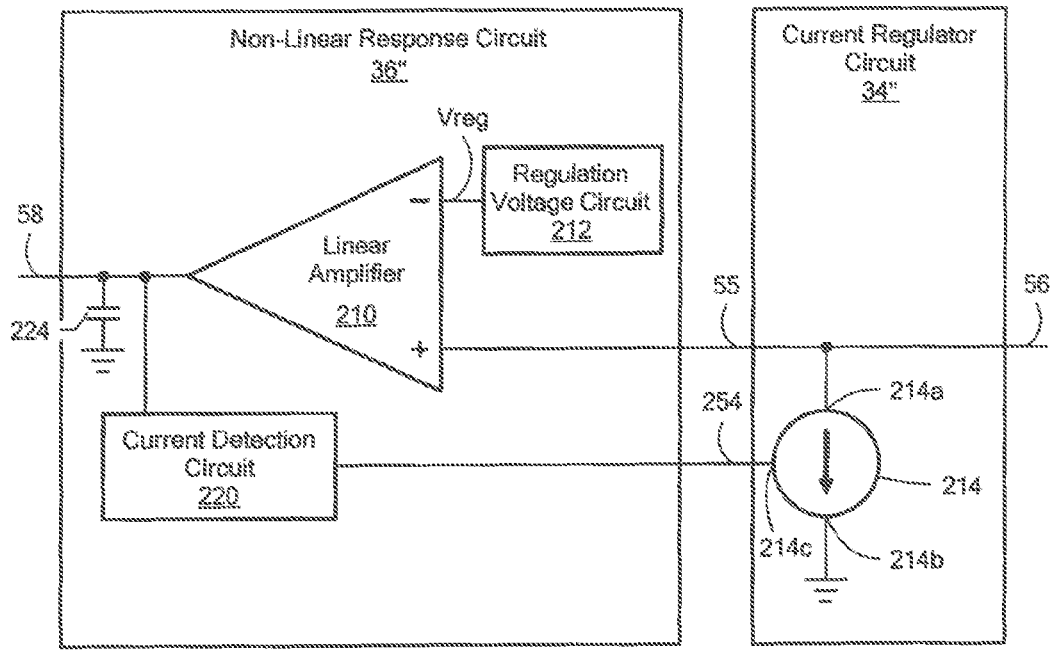
FIG. 3A is a block diagram of other examples of the non-linear response and the current regulator circuits.

Referring to FIG. 3A, another example of the current regulator circuit 34 (FIG. 1A) is a current regulator circuit 34" and another example of the non-linear response circuit 36 (FIG. 1A) is a non-linear response circuit 36". The current regulator circuit 34", here again in the form of a current sink, includes a current sink 214 having one node 214b coupled to ground and another node 214a coupled to the load by the connection 56 and to the non-linear circuit 36 by the connection 55. The non-linear response circuit 36" includes a linear amplifier 210 (sometimes called a "boost error amplifier") that includes one input coupled to the current regulator circuit 34' by the connection 55 and a second input coupled to a regulation voltage circuit 212 (similar to regulation voltage circuit 112 of FIG. 2A) that provides regulation voltage, Vreg, that is selected to guarantee sink current operation. The output of the non-linear amplifier 210 is coupled to the DC-DC converter 32 by the connection 58 and is coupled to a capacitor 224 (similar to capacitor 124 in FIG. 2A). The capacitor 224 can provide a loop filter and can have a value selected to stabilize a feedback control loop. In one example, the capacitor 224 is on the order of 10 nF. In other examples, a resistor (not shown) may be added in series with the capacitor 224 to enable a faster feedback response.

The non-linear response circuit 36" also includes a current detection circuit 220 coupled to the capacitor 224 and to the DC-DC converter 32 by the connection 58. The current detection circuit 220 is also coupled directly or indirectly to a node 214c of the current sink 214 by a connection 254. The current detection circuit 220 determines if the current through the current sink 214 drops to a predetermined threshold level (e.g., starts to drop).

In one particular example, the current detection circuit determines if the current drops by detecting if the current sink 215 is saturated. If the current detection circuit 220 detects that the current drops to the predetermined threshold level, as may be indicative of saturation of the current sink or some other current level condition, the current detection circuit 220 will supply additional current, for example, to the compensation capacitor 224 thereby increasing its voltage and the control signal level 58 concomitantly.

Figure 3B:
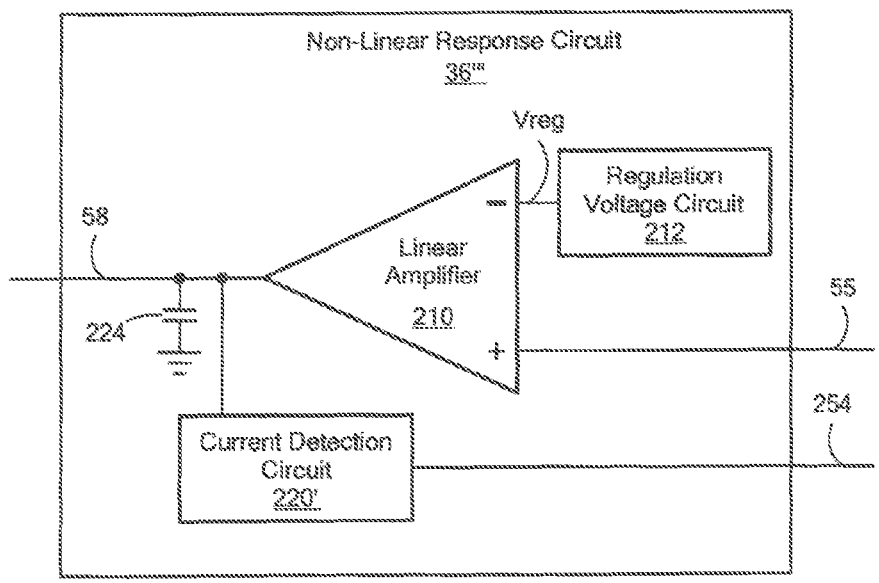
FIG. 3B is a block diagram of a further example of the non-linear response circuit.

Referring to FIG. 3B, another example of the non-linear response circuit 36 (FIG. 1A) is the non-linear response circuit 36'''. The non-linear response circuit 36''' is similar to the non-linear response circuit 36" (FIG. 3A) except a current detection circuit 220' (similar to the current detection circuit 220) is instead coupled to the linear amplifier 210 rather than being coupled to the amplifier output as is done in the embodiment of FIG. 3A. In this configuration, if the current detection circuit 220' detects that the current through the current sink 214 dropped to the predetermined threshold level, such as may be indicative of saturation (or some other current level condition), the current detection circuit 220' will enable the linear amplifier 210 to provide additional current at the amplifier output, which current increases the voltage on the compensation capacitor 224 and the level of the control signal 58 accordingly. For example, the current detection circuit 220' enables an output stage of the linear amplifier 210 to inject more current at the output of the linear amplifier 210.

Figure 4:
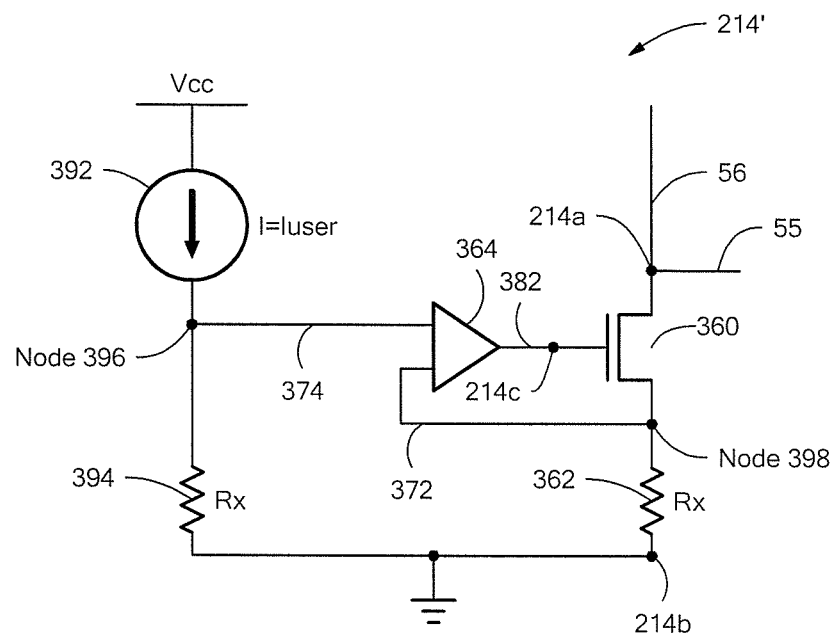
FIG. 4 is a circuit diagram of a current sink circuit.

Referring to FIG. 4, one example of the current sink 214 (FIG. 3A) is a current sink 214'. The current sink 214' includes a FET 360 having a first terminal (e.g., a drain of the FET 360) coupled to the load 40 by the connection 56 and to the non-linear response circuit 36" (FIG. 3A) by the connection 55, and a second terminal (e.g., a source of the FET 360) coupled to ground through a resistor 362 having a value R. The gate of the FET 260 is coupled to an output of an amplifier 364 by a connection 382. One input of the amplifier 364 is coupled to the second terminal (e.g., the source) of the FET 360. Another input of the amplifier 364 is coupled to a current source 392, which is coupled to ground through a resistor 394. Current source 392 is coupled to a supply voltage, Vcc.

The current sink 214' is designed to draw a desired current through the respective LED string in order to achieve a desired operation for the LEDs (i.e., a desired illumination). To this end, the current source 392 provides a user specified current according to the specifications particular to the respective LED load. The amplifier 364 is arranged such that the FET 360 conducts so as to draw the same current through the FET 360 and resistor 362 as is provided by the current source 392. In this configuration, voltage at the node 396 is the same as the voltage at node 398; hence, current through the resistor 394 is the same as the current through resistor 362 if both resistors are equal in value. In other examples, the resistors may be scaled such that the output resistor 362 is smaller than the resistor 394 and draws more current. In one particular example, a scaling factor of 1000 is used where 1 uA on the reference side produces 1 mA of current through the LEDs.

In one example, the current source 392 has current equal to $I_{user}$, which is a current set by a user. Voltage at the node 392 may be supplied to other parallel current regulators circuits (e.g., as shown in FIG. 1C), without need of a separate current regulator and resistor (392 and 394) in each current regulator circuit.

Figure 5:
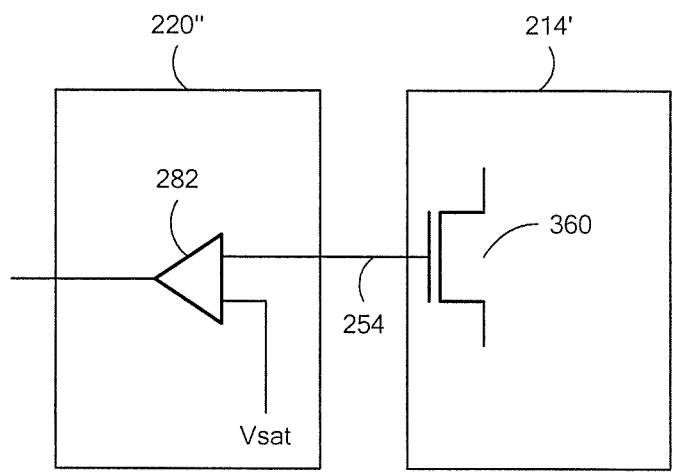
FIG. 5 is a circuit diagram of a current detection circuit.

Referring to FIG. 5, in one example, the current detection circuit 220 or 220' (FIGS. 3A and 3B) may detect current saturation by measuring the voltage at a gate of the FET 360 in the current sink 214'. In particular, a current detection circuit 220" includes a comparator 282 having a first input coupled to the gate of the FET 360 by the connection 254 and a second input connected to a voltage equal to a saturation voltage, Vsat, which can be near to a saturation voltage of the amplifier 364 (FIG. 4).

Figure 6A:
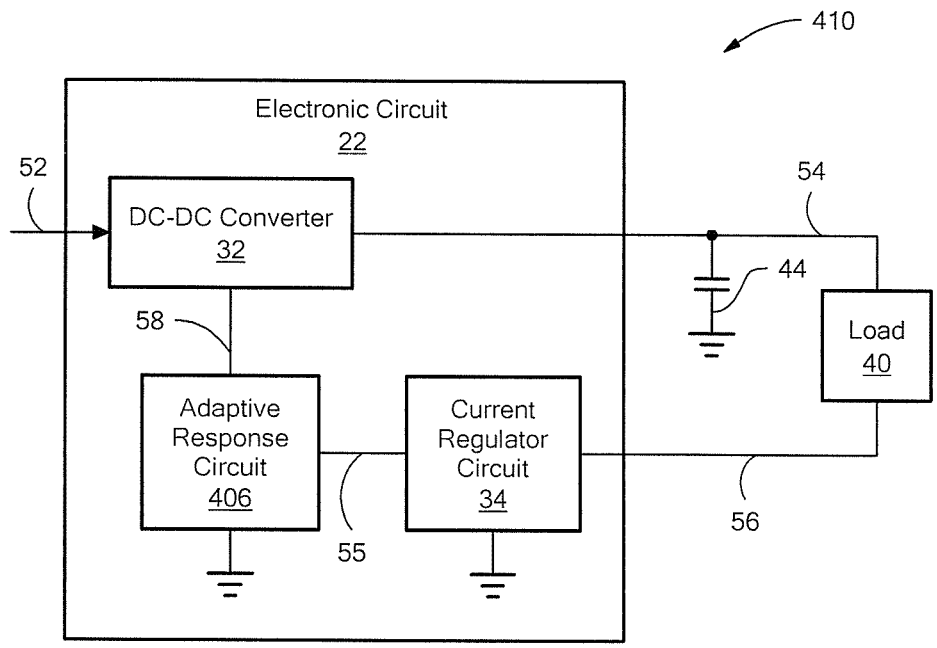
FIG. 6A is block diagram of another circuit to drive the load.
Figure 6B:
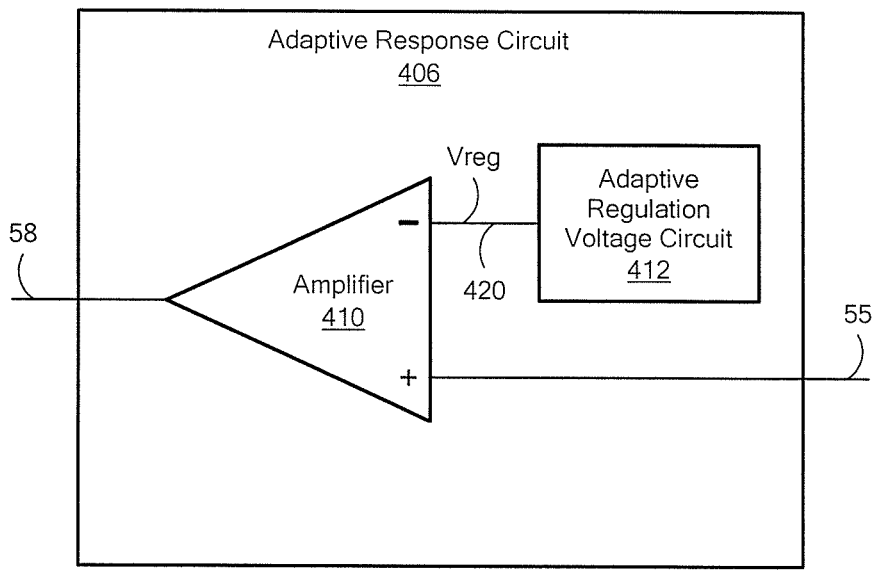
FIG. 6B is a block diagram of an adaptive response circuit.

Referring to FIGS. 6A and 6B, in which like elements have like reference characters, an alternative electronic circuit 22 includes an adaptive response circuit 406. The adaptive response circuit 406 includes an amplifier 410 having one input coupled to the current regulator circuit 34 through the connection 55 and a second input coupled to an adaptive regulation voltage circuit 412. The adaptive regulation voltage circuit 412 is configured to provide to the amplifier 410 a regulation voltage, Vreg, through a connection 420.

Typically, for example, as shown in FIG. 3A, a regulation voltage is a fixed voltage chosen to guarantee that for worst-case scenarios, in terms of temperature, processing constraints and other electrical constraints, the current regulator circuit 34 (FIG. 1A) is provided with sufficient voltage for proper operation. As a result, this regulation voltage tends to be much higher than necessary under normal operating conditions, resulting in unnecessarily high power dissipation. In contrast, the adaptive regulation voltage circuit 412 provides a regulation voltage 420 that is determined based on actual operating conditions, thereby resulting in a regulation voltage, Vreg, that is lower than necessary to accommodate worst case scenarios but high enough to ensure proper operation of the current regulator 34. In particular, the adaptive regulation voltage circuit 412 includes circuitry that "mimics" or replicates the current regulator circuit 34 and is configured to determine a drop off voltage level of the current regulator circuit, i.e., a voltage at which the current regulator 34 ceases to operate properly. The adaptive regulation voltage circuit 412 provides the regulation voltage 420 at a level above the drop off voltage level. For example, the circuitry in the adaptive regulation voltage circuit 412 may be a scaled down version of the current regulator circuit 34 but with comparable physical and electrical characteristics. Thus, if there are conditions (e.g., temperature) that affect the current regulator circuit 34 and in particular its drop off voltage, the adaptive regulation circuit 412 will correspondingly adjust the regulation voltage 420, since it will be affected in substantially the same manner.

Figures 7A, 7B:
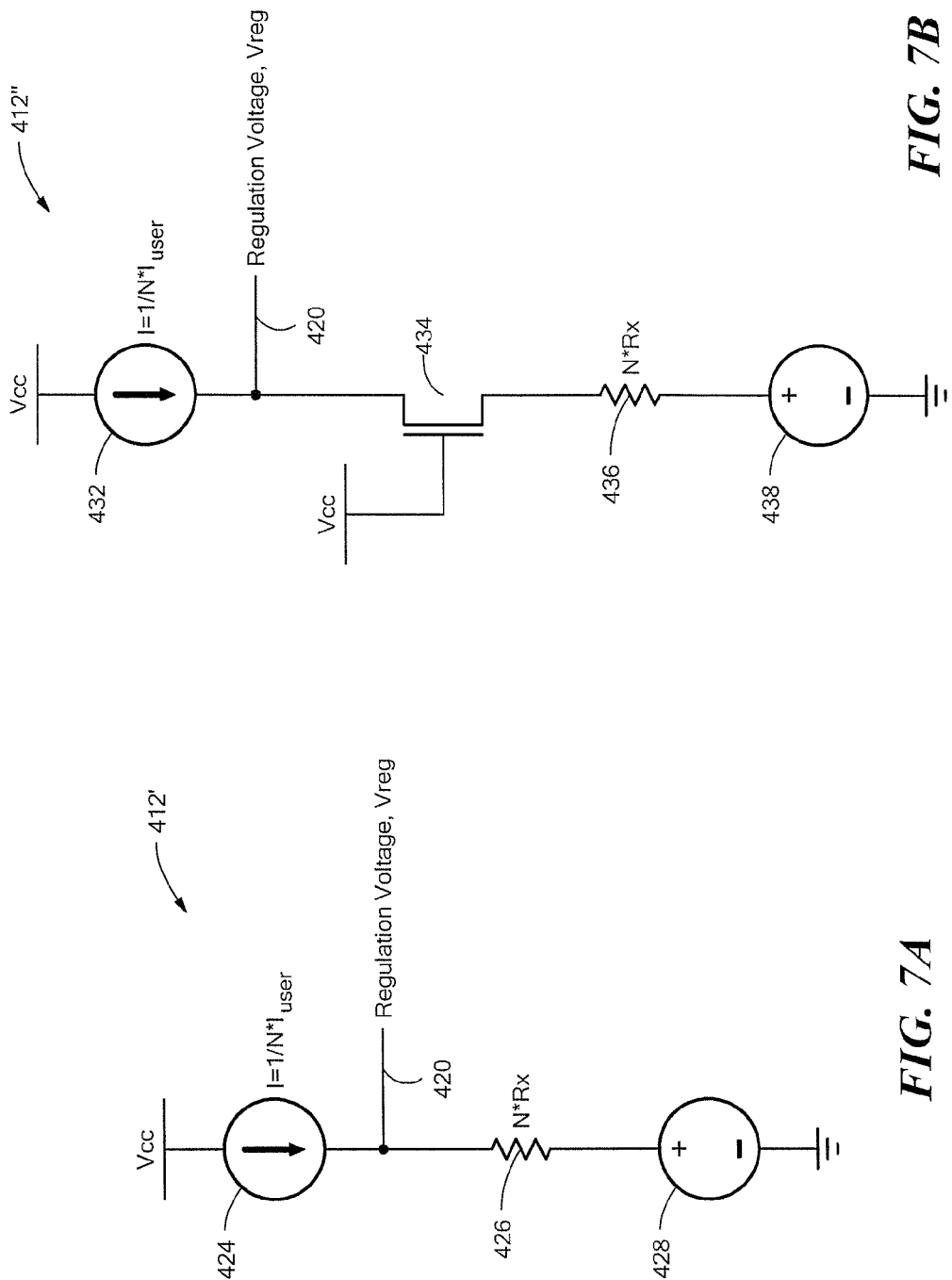
FIGS. 7A and 7B are circuit diagrams of examples of adaptive regulation voltage circuits.

Referring to FIG. 7A, one example of the adaptive regulation voltage circuit 412 (FIG. 6B) is an adaptive regulation voltage circuit 412'. The adaptive regulation voltage circuit 412' includes a current source 424 coupled at one end to a voltage supply, Vcc, and coupled at another end to a resistor 426 which is further coupled to a voltage source 428. The current source 424 is a current mirror of the current source 392 (FIG. 4) of the current sink circuit 214'. The resistor 426 is a scaled version of the resistors 394 and 362 (FIG. 4). For example, the resistance is equal to $N*R_x$, where $N \geq 1$. Likewise, the current source 424, though being a mirror of current source 392, is scaled so that the current provided is equal to $(1/N)*I_{user}$.

The voltage source 428 represents an amount of headroom required to allow proper operation of the current sink 214' (FIG. 4). In this configuration, the regulation voltage 420 (See also FIG. 6B) is provided between the current source 424 and the resistor 426.

In one example, if a worse case scenario assumed a regulation voltage of 650 mV, the voltage source 428 provided by the adaptive regulation voltage circuit 412' may be reduced to 350 mV, for example, at room temperature. It will be recognized that the voltage provided by the voltage source 428 is related to a voltage headroom required by the current sink 214' (FIG. 4). As voltages within the circuit 412' change, for example, due to temperature, the regulation voltage 428 will change in substantially the same manner. Reduced power consumption by the circuit 412' results.

Referring to FIG. 7B, another example of the adaptive regulation voltage circuit 412 (FIG. 6B) is an adaptive regulation voltage circuit 412". The adaptive regulation voltage circuit 412" includes a current source 432 coupled at one end to a voltage supply, Vcc, and the other end coupled to a first terminal (e.g., a drain) of a FET 434. A second terminal (e.g., a source) of the FET 434 is connected to a resistor 436 and a gate of the FET 434 is connected to the voltage supply Vcc. The resistor 436 is connected to a voltage source 438. The current source 432 is a current mirror of the current source 392 (FIG. 4) of the current regulator circuit 214'. The resistor 436 is a scaled version of the resistors 394 and 362 (FIG. 4). The resistor 436 is a scaled version of the resistors 394 and 362. For example, the resistance is equal to $N*R_x$. Likewise, the current source 432, though being a mirror of current source 392, is scaled so that the current provided is equal to $(1/N)*I_{user}$.

The voltage source 438 represents an amount of headroom required to allow proper operation of the current sink 214' (FIG. 4). The FET 434 is electrically the same as the FET 360 (FIG. 4) and is fully "on." The regulation voltage 420 is provided between the current source 432 and the FET 434.

In this electrical configuration, a lower regulation voltage is required than in circuit 412' for the same load 40 and the dynamic range of the circuit 412' is increased because circuit 412" accounts for variations of the FET 360 (e.g., due to temperature). In one particular example, if a worse case scenario assumed a regulation voltage of 650 mV, the voltage source 438 provided by the adaptive regulation voltage circuit 412" may be reduced to 150 mV, for example, at room temperature. It will be recognized that the voltage provided by the voltage source 438 is related to a voltage headroom required by the current sink 214' (FIG. 4). As voltages within the circuit 412" change, for example, due to temperature, the regulation voltage 438 will change in substantially the same manner. Reduced power consumption by the current sink 412" results.

While resistor 394 (FIG. 4) is shown to have a value, Rx, the same as the resistor 362, in other embodiments, the resistor 394 (and the current source 392) can be differently scaled.

Elements of different embodiments described herein may be combined to form other embodiments not specifically set forth above. Other embodiments not specifically described herein are also within the scope of the following claims.

What is claimed is:

1. A circuit comprising:
    a switching regulator configured to provide power to a load;
    a current regulator circuit coupled to the load; and
    a response circuit configured to provide a control signal to the switching regulator in response to electrical changes of the current regulator circuit,
    wherein the control signal changes non-linearly with respect to the electrical changes at the current regulator circuit, and
    wherein the response circuit is configured to provide a non-linear increase to the control signal in response to a voltage drop at the current regulator circuit.

2. The circuit of claim 1 wherein the non-linear increase to the control signal comprises increasing a current output of the response circuit.

3. The circuit of claim 1 wherein the non-linear increase to the control signal is an exponentially related to the electrical changes of the current regulation circuit.

4. The circuit of claim 1 wherein the switching regulator is a DC-DC converter.

5. The circuit of claim 1 wherein the response circuit comprises an amplifier.

6. The circuit of claim 5 wherein the amplifier receives a first input from a regulation voltage circuit and a second input from the current regulator circuit.

7. The circuit of claim 5 wherein the amplifier is a non-linear amplifier.

8. The circuit of claim 5 wherein the amplifier is a linear amplifier.

9. The circuit of claim 8, further comprising a current detection circuit configured to determine if a current at the current regulator circuit reaches a predetermined threshold level.

10. The circuit of claim 9 wherein the current detection circuit enables the linear amplifier to increase a current output of the linear amplifier if a current at the current regulator circuit reaches the predetermined threshold level.

11. The circuit of claim 9 wherein the current detection circuit provides additional current if current at the current regulator circuit reaches a predetermined threshold level.

12. The circuit of claim 1 wherein the voltage drop at the current regulator circuit corresponds to a voltage at the current regulator circuit falling below a predetermined threshold.

13. The circuit of claim 12 wherein the predetermined threshold is related to a minimum operating voltage associated with the current regulator circuit.

14. The circuit of claim 1 wherein the load comprises one or more light emitting diodes (LEDs).

15. A circuit comprising:
a switching regulator configured to provide power to a load;
a current regulator circuit coupled to the load;
a response circuit configured to provide a control signal to the switching regulator in response to electrical changes of the current regulator circuit; and
a current detection circuit configured to determine if a voltage at the current regulator circuit is saturated,
wherein the control signal changes non-linearly with respect to the electrical changes at the current regulator circuit, and
wherein the response circuit comprises a linear amplifier.

16. The circuit of claim 15 wherein the current detection circuit causes the linear amplifier to increase a current output of the linear amplifier if the voltage at the current regulator circuit is saturated.

17. The circuit of claim 15 wherein the current detection circuit provides additional current to the switching regulator if the voltage at the current regulator circuit is saturated.

18. A circuit comprising:
a switching regulator configured to provide power to a load;
a current regulator circuit coupled to the load; and
an adaptive response circuit comprising:
an amplifier configured to provide a control signal to the switching regulator in response to electrical changes at the current regulator and comprising a first input and a second input coupled to the current regulator circuit; and
an adaptive regulation voltage circuit configured to provide a regulation voltage to the first input of the amplifier to maintain operability of the current regulator circuit,
wherein the adaptive regulation voltage circuit replicates electrical characteristics of the current regulator circuit,
wherein the adaptation regulation circuit comprises a first current source that mirrors a second current source in the current regulator circuit, and
wherein the first current source in the adaptation regulation circuit provides a current that is 1/N times a current provided by the second current source in the current regulation circuit, where N≥1.

19. The circuit of claim 18 wherein the adaptation regulation circuit further comprises:
a voltage source coupled to ground; and
and a first resistor coupled between the voltage source and the first current source,
wherein the current regulator circuit comprises a second resistor coupled to the second current source,
wherein resistance of first resistor is N times resistance of the second resistor.

20. The circuit of claim 19 wherein the first current source is coupled to the first resistor and the regulation voltage is provided at a node between the first resistor and the first current source.

21. The circuit of claim 18 wherein current regulation circuit further comprises a second FET, and
wherein the first FET and the second FET have the same electrical characteristics.

22. The circuit of claim 19 wherein the adaptive regulation circuit further comprises a first field effect transistor (FET) with one of a drain or a source coupled to the first resistor and the other one of the drain or source coupled to the first current source,
wherein the regulation voltage is provided at a node between the first FET and the second current source.

23. The circuit of claim 22 wherein the first FET is fully on.

* * * * *

UNITED STATES PATENT AND TRADEMARK OFFICE
CERTIFICATE OF CORRECTION

PATENT NO. : 8,692,482 B2
APPLICATION NO. : 12/966139
DATED : April 8, 2014
INVENTOR(S) : Gregory Szczeszynski et al.

Page 1 of 1

It is certified that error appears in the above-identified patent and that said Letters Patent is hereby corrected as shown below:

In the Drawings

Sheet 5, FIG. 3B, the line from Current Detection Circuit 220' should be directly connected to Linear Amplifier 210. (See below)

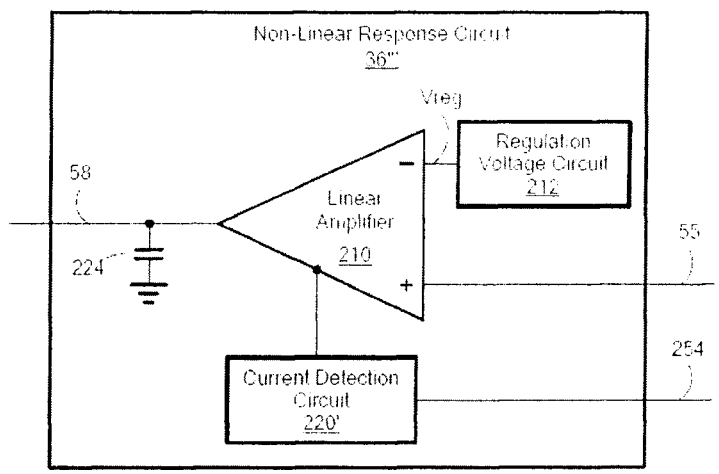

*FIG. 3B*

In the Specification

Column 6, Line 34, delete "R." and replace with --Rx--.

Column 6, Line 60, delete "regulators" and replace with --regulator--.

Column 8, Line 18-19, delete "The resistor 436 is a scaled version of the resistors 394 and 362" because it is a duplicate sentence.

Signed and Sealed this
Twenty-fifth Day of August, 2015

Michelle K. Lee
*Director of the United States Patent and Trademark Office*